US012747724B2

(12) United States Patent
Brown et al.

(10) Patent No.: US 12,747,724 B2
(45) Date of Patent: Sep. 29, 2026

(54) ACTUATOR ASSEMBLY

(71) Applicant: CAMBRIDGE MECHATRONICS LIMITED, Cambridge (GB)

(72) Inventors: Andrew Benjamin Simpson Brown, Cambridge (GB); Robin Eddington, Cambridge (GB); Jae Kim Kang, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 36 days.

(21) Appl. No.: 19/110,844

(22) PCT Filed: Sep. 18, 2023

(86) PCT No.: PCT/GB2023/052410
§ 371 (c)(1),
(2) Date: Mar. 12, 2025

(87) PCT Pub. No.: WO2024/057043
PCT Pub. Date: Mar. 21, 2024

(65) Prior Publication Data

US 2026/0085668 A1 Mar. 26, 2026

(30) Foreign Application Priority Data

Sep. 16, 2022 (GB) ...................................... 2213594
Aug. 21, 2023 (GB) ...................................... 2312765

(51) Int. Cl.
*F03G 7/06* (2006.01)
*G02B 13/00* (2006.01)
(Continued)

(52) U.S. Cl.
CPC ......... *F03G 7/064* (2021.08); *G02B 13/0075* (2013.01); *F03G 7/06143* (2021.08); *G02B 7/09* (2013.01); *G02B 7/185* (2013.01)

(58) Field of Classification Search
CPC .... F03G 7/064; F03G 7/06143; F03G 7/0665; G02B 13/0075; G02B 7/09; G02B 7/185;
(Continued)

(56) References Cited

U.S. PATENT DOCUMENTS

2005/0052094 A1 3/2005 Henderson
2010/0074607 A1* 3/2010 Topliss .................... G03B 3/10
60/527
(Continued)

FOREIGN PATENT DOCUMENTS

CN 111698398 A 9/2020
CN 114520858 A 5/2022
(Continued)

OTHER PUBLICATIONS

International Preliminary Report on Patentability for International Application No. PCT/GB2023/052410, dated Mar. 27, 2025, 8 Pages.

(Continued)

*Primary Examiner* — Yogesh K Aggarwal

(74) *Attorney, Agent, or Firm* — Van Hoven PC; Stefan D. Osterbur; Joshua Van Hoven

(57) ABSTRACT

An actuator assembly is disclosed. The actuator assembly comprises a support structure (2); a first movable part (10); a second movable part (12); an actuator arrangement configured to drive rotation of the first movable part around a primary axis (O) relative to the support structure; a first bearing arrangement (20, 21) configured to convert said rotation of the first movable part into helical movement of (Continued)

the first movable part around the primary axis relative to the support structure; a rotation control arrangement capable of limiting rotation of the second movable part around the primary axis relative to the support structure; and a second bearing arrangement (30, 31) configured such that, when the first movable part undergoes said helical movement and the second movable part undergoes said rotation limitation, the second movable part undergoes translational movement along the primary axis relative to the support structure and/or the first movable part.

29 Claims, 7 Drawing Sheets

(51) Int. Cl.
*G02B 7/09* (2021.01)
*G02B 7/185* (2021.01)

(58) Field of Classification Search
CPC .................... G02B 7/023; G03B 30/00; G03B 2205/0076; G03B 3/10; G03B 5/00; H04N 23/54
See application file for complete search history.

(56) References Cited

U.S. PATENT DOCUMENTS

| | | | | |
|---|---|---|---|---|
| 2017/0336646 | A1* | 11/2017 | Miller .................... | G02B 27/64 |
| 2020/0200991 | A1* | 6/2020 | Peng ...................... | G02B 7/026 |
| 2022/0179229 | A1 | 6/2022 | Ni et al. | |

FOREIGN PATENT DOCUMENTS

| | | | |
|---|---|---|---|
| WO | 2007113478 | A1 | 10/2007 |
| WO | 2019243849 | A1 | 12/2019 |
| WO | 2021209769 | A1 | 10/2021 |

OTHER PUBLICATIONS

Office Action for European Application No. 23777342.9, dated Apr. 9, 2026, 7 pages.
International Search Report and Written Opinion for Application No. PCT/GB2023/052410 dated Dec. 8, 2023 (10 pages).
Search Report for Application No. GB2213594.1 dated Aug. 25, 2023, 2024 (1 page).

* cited by examiner

ACTUATOR ASSEMBLY

CROSS-REFERENCE TO RELATED APPLICATIONS

The present application is a U.S. National Phase Application under 35 U.S.C. 371 of International Patent Application No. PCT/GB2023/052410, filed Sep. 18, 2023, which claims priority to GB Patent Application No. GB2213594.1, filed on Sep. 16, 2022, and also to GB Patent Application No. GB2312765.7, filed on Aug. 21, 2023, and the contents of each of these applications are hereby incorporated by reference herein in their entireties for all purposes.

FIELD

The present application relates to an actuator assembly.

BACKGROUND

It is known to use an actuator, for example a shape memory alloy, SMA, wire, to drive translational movement of a movable element with respect to a support structure. SMA actuator wires have particular advantages in miniature devices and may be applied in a variety of devices including handheld devices, such as cameras and mobile phones. Such SMA actuator wires may be used for example in an optical device such as a camera for driving translational movement of a camera lens element along its optical axis, for example to effect focussing (autofocus, AF) or zoom.

Some examples of an SMA actuation apparatuses which are cameras of this type are disclosed in WO-2007/113478. Herein, the movable element is a camera lens element supported on a support structure by a helical bearing arrangement comprising flexures that guide translational movement along the optical axis. In one example described herein, the SMA actuator wire is a piece of SMA wire connected at its ends to a support structure and hooked over a hook on a camera lens element for driving the translational movement. The straight SMA actuator wires formed by the portions of the piece of SMA wire on either side of the hook extend at an acute angle of greater than 0 degrees to the movement direction parallel to the optical axis. Angling the SMA actuator wires in this way increases the amount of movement compared to an SMA actuator wire extending along the movement direction and also reduces the extent of the actuator in the movement direction.

WO 2019/243849 A1 discloses an SMA apparatus comprising a helical bearing arrangement that converts rotation around a helical axis into a helical movement.

It is desirable for the actuator to have a higher stroke, i.e. for the range of movement along the helical axis to be increased. More particularly it is desirable to increase the stroke without unduly decreasing the accuracy and repeatability of the movement.

SUMMARY

According to an aspect of the present invention, there is provided an actuator assembly comprising: a support structure; a first movable part; a second movable part; an actuator arrangement configured (on actuation) to drive rotation of the first movable part around a primary axis relative to the support structure (and relative to the second movable part); a first bearing arrangement (supporting the first movable part on the support structure) configured to convert said rotation of the first movable part into helical movement of the first movable part around the primary axis relative to the support structure (and relative to the second movable part); a rotation control arrangement capable of limiting rotation of the second movable part around the primary axis relative to the support structure; and a second bearing arrangement configured such that, when the first movable part undergoes said helical movement and the second movable part undergoes said rotation limitation, the second movable part undergoes (non-rotational) translational movement along the primary axis relative to the support structure and/or the first movable part.

By providing the second movable part and the second bearing arrangement, the stroke of the actuator assembly may be increased without unduly increasing normal forces on the first bearing arrangement. The second movable part may move a greater distance along the axis for a given level of actuation of the actuator arrangement compared to the first movable part. The stroke and/or gain of the actuator assembly may be increased without unduly decreasing the accuracy of movement.

Optionally, the rotation control arrangement is an anti-rotation arrangement configured to prevent rotation of the second movable part around the primary axis relative to the support structure.

By providing an anti-rotation arrangement, the second movable part may be prevented from rotating. This may allow the actuator assembly to be used in mechanisms which require the rotational position of the movable part to remain constant (e.g. a non-rotationally symmetric optical element).

Optionally, the anti-rotation arrangement comprises a third bearing arrangement (e.g. comprising a linear bearing) configured to provide said rotation prevention.

By providing the third bearing arrangement, the second movable part may move more stably and reliably.

Optionally, the rotation control arrangement comprises a further actuator arrangement configured (on actuation) to drive rotation of the second movable part around the primary axis relative to the first movable part and/or the support structure so as to provide said rotation limitation.

By providing the further actuator arrangement, the rotational position of the second movable part may be more accurately controlled.

Optionally, the first bearing arrangement comprises a helical bearing configured to guide relative helical movement between the first movable part and the support structure around the primary axis.

By providing a helical bearing, the rotation of the first movable part may be converted into a helical movement including movement along the primary axis in a simple and energy-efficient manner.

Optionally, the second bearing arrangement comprises a helical bearing configured to guide relative helical movement between the first movable part and the second movable part around the primary axis.

Optionally, the helical bearing of the first bearing arrangement is positively angled relative to a plane normal to the primary axis, and the helical bearing of the second bearing arrangement is negatively angled relative to a plane normal to the primary axis. In other words, the helical bearing of the first bearing arrangement has a positive slope/gradient relative to a plane normal to the primary axis, and the second bearing arrangement has a negative slope/gradient relative to a plane normal to the primary axis.

By providing helical bearings with opposing angles, the second bearing arrangement will undergo (non-rotational) translational movement along the primary axis relative to the first movable part when the first movable part undergoes said helical movement and the second movable part undergoes said rotation limitation.

Optionally, the actuator arrangement comprises one or more shape memory alloy (SMA) elements (e.g. SMA wires) configured to (on contraction) drive the rotation of the first movable part in a first sense.

By providing SMA elements, the rotation of the first movable part may be controlled in a particularly accurate and simple manner.

Optionally, the actuator arrangement comprises one or more SMA elements configured to (on contraction) drive the rotation of the first movable part in a second sense, which is opposite to the first sense.

By providing SMA elements that drive rotation in opposite senses, the rotation of the first movable part may be controlled more accurately.

Opposing SMA elements are optional. After actuation, the actuator assembly can be 'reset' by manually moving the first and/or second movable parts back to the retracted/collapsed position. Alternatively, the actuator assembly may have a biasing arrangement configured to bias the first and/or second movable parts back to the retracted/collapsed position, e.g. a biasing arrangement configured to oppose the helical movement of the first movable part and/or the translational movement of the second movable part driven by the actuator arrangement. In other words, the actuator assembly may have a biasing arrangement (e.g. comprising one or more springs and/or magnets) configured to oppose the rotation of the first movable part in the first sense.

Optionally, the one or more SMA elements configured to drive the rotation of the first movable part in the first sense comprise: an SMA element coupled to the support structure and the first movable part, and/or an SMA element coupled to the first movable part and the second movable part.

Optionally, the one or more SMA elements configured to drive the rotation of the first movable part in the second sense comprise: an SMA element coupled to the support structure and the first movable part, and/or an SMA element coupled to the first movable part and the second movable part.

Optionally, the one or more SMA elements configured to drive the rotation of the first movable part in the first sense extend in, and/or extend at an acute angle to, a plane normal to the primary axis (when the first movable part is in an intermediate/mid position between a retracted/collapsed position and an extended/popped-out position).

Optionally, the one or more SMA elements configured to drive the rotation of the first movable part in the second sense extend in, and/or extend at an acute angle to, a plane normal to the primary axis (when the first movable part is in an intermediate/mid position between a retracted/collapsed position and an extended/popped-out position).

Optionally, the actuator arrangement comprises (e.g. a total of) four SMA elements configured to drive the rotation of the first movable part; wherein the four SMA elements are arranged in a loop at different angular positions around the primary axis; and wherein successive SMA elements around the primary axis are configured (on contraction) to apply a force to the first movable part in alternate senses around the primary axis. Optionally, each SMA element of the four SMA element crosses over at least one of the other SMA elements when viewed along the primary axis.

Optionally, the support structure, the first movable part and the second movable part are stacked along the primary axis. Optionally, the main body/centre/central portion of the first movable part is configured to be positioned between the support structure and the second movable part along the primary axis at any position within the range of possible movement of the first movable part.

Optionally, the actuator assembly is configured such that: when the actuator assembly is in a retracted/collapsed state, the first movable part (e.g. the main body/centre/central portion thereof) is nested within a space/opening/aperture/pocket defined/enclosed by the support structure; and when the actuator assembly is in an extended/popped-out state, the first movable part (e.g. the main body/centre/central portion thereof) is positioned outside the space defined by the support structure. The second movable part may not be configured to be nested within the first movable part, i.e. the main body/centre/central portion of the second movable part may be configured to be positioned above the first movable part along the primary axis at any position within the range of possible movement of the first movable part.

Optionally, the actuator assembly is configured such that: when the actuator assembly is in a retracted/collapsed state (this corresponds to the retracted/collapsed state mentioned in the previous paragraph), the second movable part (e.g. the main body/centre/central portion thereof) is nested within a space/opening/aperture/pocket defined/enclosed by the first movable part; and when the actuator assembly is in an extended/popped-out state (this corresponds to the extended/popped-out state mentioned in the previous paragraph), the second movable part (e.g. the main body/centre/central portion thereof) is positioned outside the space defined by the first movable part. The space described in the previous paragraph (i.e. the space defined by the support structure) and the space described in this paragraph (i.e. the space defined by the first movable part) may overlap.

Optionally, only the first movable part may be configured to be nested in the retracted state.

Optionally, only the second movable part may be configured to be nested in the retracted state.

By nesting, the size of the actuator assembly in a direction along the primary axis may be reduced.

Optionally, the actuator assembly is configured to retain the second movable part in position with respect to the support structure when the actuator arrangement is unpowered.

Optionally, the actuator assembly comprises a first friction surface and a second friction surface, wherein the first friction surface is configured to engage the second friction surface. The actuator assembly may comprise a biasing arrangement configured to bias the first and second friction surface against each other, so as to generate static frictional forces that constrain the movement of the second movable part relative to the support structure at any position within the range of possible movement of the second movable part when the actuator arrangement is not driving the rotation of the first movable part (and/or when the actuator arrangement is unpowered).

Optionally, the first bearing arrangement comprises a friction surface of the support structure configured to engage a friction surface of the first movable part, and/or wherein the second bearing arrangement comprises a friction surface of the first movable part configured to engage a friction surface of the second movable part; and wherein the actuator assembly comprises a biasing arrangement configured to bias the friction surfaces of the first bearing arrangement and/or bias the friction surfaces of the second bearing arrangement against each other, so as to generate static frictional forces that constrain the movement of the first movable part relative to the support structure (and relative to the second movable part) at any position within the range of possible movement of the first movable part when the actuator arrangement is not driving the rotation of the first movable part.

By generating the static frictional forces, the position of the second movable part may be maintained with decreased power and/or energy requirements.

Providing a biasing arrangement configured to bias parts of the assembly together is optional, as e.g. pin-in-slot bearings could be provided to hold the parts of the assembly together.

Optionally, the actuator assembly comprises a holding arrangement configured to releasably (i.e. temporarily) hold the first movable part at one or more positions within the range of possible positions that the first movable part is capable of being driven to (e.g. by the actuator arrangement).

By providing a holding arrangement, the position of the first movable part (and the second movable part) may be maintained with greater resistance to external forces (e.g. due to inertial shocks).

Optionally, the actuator assembly comprises a bistable arrangement configured to cause the first movable part to have a first stable equilibrium position (at a first position around the primary axis), a second stable equilibrium position (at a second position around the primary axis), and an unstable equilibrium position between the first and second stable equilibrium positions (at a third intermediate position around the primary axis). The first and second stable equilibrium positions may correspond to ends of the range of possible movement of the first movable part relative to the support structure. The bistable arrangement may comprise e.g. a spring, a flexure, or one or more magnets configured to exert a force on the first movable part so as to provide such bi-stableness.

Optionally, the actuator arrangement comprises two shape memory alloy (SMA) elements which cross over each other when viewed along the primary axis.

Optionally, the actuator arrangement comprises a first pair of SMA elements and a second pair of SMA elements. Each of the first pair of SMA elements cross over each of the second pair of SMA elements when viewed along the primary axis.

Optionally, in embodiments in which the actuator assembly comprises two or more SMA elements, each of the SMA elements is disposed within a footprint of one or both of the first and second movable parts when viewed along the primary axis (i.e. the SMA elements lie within the footprint of the first movable part and/or within the footprint of the second movable part). Alternatively, one or more of the SMA elements may fully or partially overlap with one or both of the first and second movable parts when viewed along the primary axis.

Optionally, the second movable part comprises a display. In some embodiments, the actuator arrangement is disposed on a first side of the display opposite to a second side of the display, from which light is emitted.

Optionally, the second movable part comprises an optical component or a part thereof. For example, the second movable part may comprise a lens or a mirror.

Optionally, the second movable part may comprise (or be engaged with) a deformable optical component, e.g. a deformable lens or a deformable mirror, or a part thereof. Optionally, the second movable part comprises a part of a lens, e.g. a surface or part of a deformable lens. Optionally, the second movable part comprises a part of a mirror, e.g. a surface or part of a deformable mirror. Movement of the second movable part along the primary axis may thus drive deformation of a deformable optical component. This may be done for the purpose of changing an optical property, e.g. the focal length or some other optical property, of the optical element.

Further details regarding the deformation of a deformable lens, e.g. a liquid lens, may be found in WO2020030915A1, which is incorporated herein by reference in its entirety.

Optionally, the actuator arrangement is configured to apply a force to the first movable part at a first point to drive rotation of the first movable part around the primary axis relative to the support structure. A distance between the primary axis and the first point may less than a distance between the primary axis and the first bearing arrangement. For example, in embodiments in which the actuator arrangement comprises one or more SMA wires, the first point may correspond to a point at which an SMA wire is attached (e.g. crimped) or hooked onto the first movable part. The first bearing arrangement may be a helical bearing. The first bearing may comprise one or more contact points between the first movable part and the second movable part (or between the first movable part and an intermediate component such as a rolling component in the case that the first bearing arrangement comprises a rolling bearing). At least one (optionally all) of the one or more contact points may be further from the primary axis (the axis about which the first movable part rotates) than the first point is. It will be appreciated that the actuator arrangement may be arranged to apply a force to the first movable part at multiple points. One or more (or all) such points may be closer to the primary axis than the first bearing arrangement is. One or more (or all) such points may be closer to the primary axis than the one or more contact points of the first bearing arrangement are. A technical effect of such an arrangement, in which the bearing arrangement is radially further from the axis of rotation (the primary axis) than the actuator arrangement is is that the helical bearing of the bearing arrangement may be made to be less steep (as compared to a scenario in which the bearing arrangement is close in to the axis of rotation). A shallower angle is facilitated by the bearing surfaces being further away. Advantages of such a shallower angle are:

- reduced normal forces on the bearing surfaces and hence reduced frictional forces and
- more accurate placement of the first movable part (e.g. because a tolerance error in the position of the bearing surface has a smaller impact on the height of the surface and so a smaller impact on a tilt of the first movable part).

Such an arrangement may not necessarily be limited to an arrangement with two movable parts, as described above. There is therefore disclosed an actuator assembly comprising:

- a support structure;
- a movable part;
- an actuator arrangement configured to drive rotation of the movable part around a primary axis relative to the support structure; and
- a first bearing arrangement configured to convert said rotation of the movable part into helical movement of the movable part around the primary axis relative to the support structure, wherein the actuator arrangement is configured to apply a force to the movable part at a first point to drive rotation of the movable part around the primary axis relative to the support structure, wherein a distance between the primary axis and the first point is less than a distance between the primary axis and the first bearing arrangement.

Optionally, the first point may correspond to a point at which an SMA wire is attached (e.g. crimped) or hooked onto the first movable part. The first bearing arrangement may be a helical bearing. The first bearing may comprise one or more contact points between the movable part and the support structure (or between the movable part and an intermediate component such as a rolling component in the case that the first bearing arrangement comprises a rolling bearing). At least one (optionally all) of the one or more contact points may be further from the primary axis (the axis about which the movable part rotates) than the first point is. It will be appreciated that the actuator arrangement may be arranged to apply a force to the movable part at multiple points. One or more (or all) such points may be closer to the primary axis than the first bearing arrangement is. One or more (or all) such points may be closer to the primary axis than the one or more contact points of the first bearing arrangement are. Such an arrangement may be combined with any other feature disclosed herein.

According to another aspect of the present invention, there is provided an actuator assembly comprising: a support structure; a first movable part; a second movable part; a first helical bearing arrangement configured to guide helical movement of the first movable part relative to the support structure around a helical axis; an actuator arrangement configured, on actuation, to drive rotation of the first movable part around the helical axis relative to the support structure which the first helical bearing arrangement converts into said helical movement of the first movable part; and a second bearing arrangement configured to guide rotational or helical movement of the second movable part relative to the first movable part around the helical axis, such that upon helical movement of the first movable part relative to the support structure and rotational or helical movement of the second movable part relative to the first movable part, the second movable part is translationally movable along the helical axis relative to the support structure.

The actuator assembly can be used for AF, zoom, haptics, optical image stabilisation (OIS), valves, augmented reality (AR) applications, etc.

BRIEF DESCRIPTION OF THE DRAWINGS

Certain embodiments of the present invention will now be described, by way of example only, with reference to the accompanying drawings in which.

DETAILED DESCRIPTION

Figure 1:
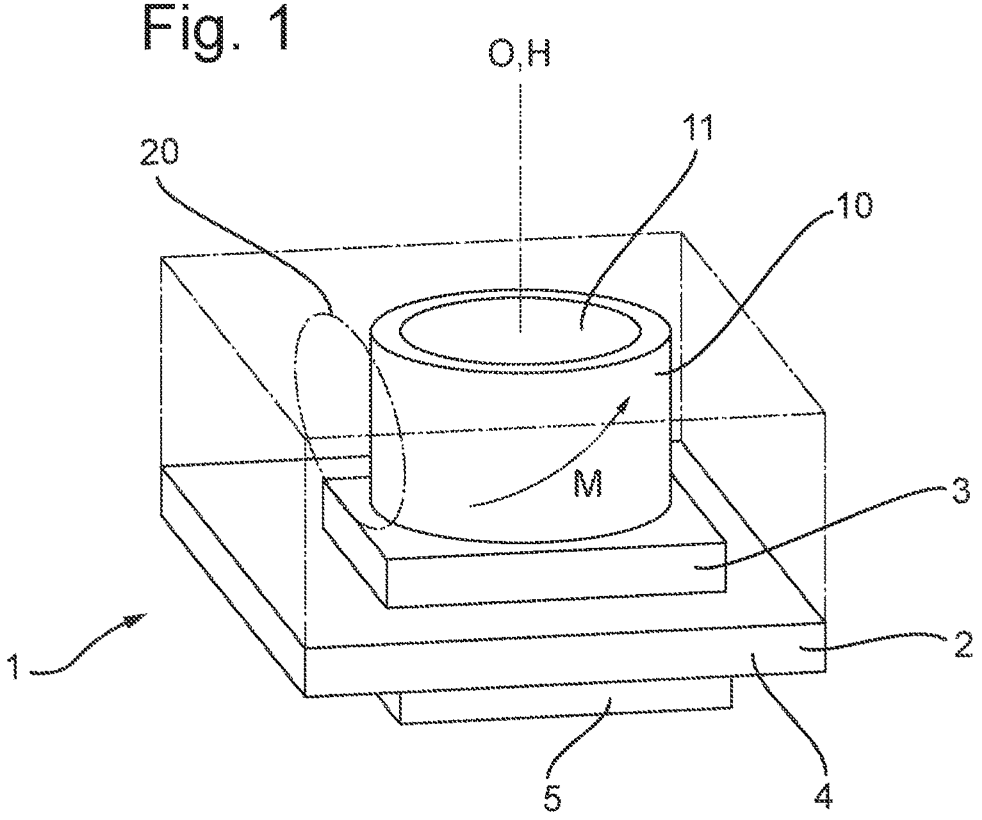
FIG. 1 is a schematic view of an actuator assembly with a helical bearing arrangement.

Actuator Assembly of FIG. 1

FIG. 1 is a schematic view of an actuator assembly 1 having a single movable part 10 configured to move helically around a helical axis H relative to a support structure 2. The actuator assembly 1 is herein described primarily in the context of the actuator assembly 1 being part of a miniature camera. However the actuator assembly 1 is not required to be part of a camera and may be part of a different type of apparatus.

The support structure 2 has one or more components fixed to it, for example mounted onto it. The support structure 2 has an image sensor 3 mounted thereon. The support structure 2 may take any suitable form, typically including a base 4 to which the image sensor 3 is fixed. The support structure 2 may also support an integrated circuit (IC) chip 5.

The first movable part 10 comprises a lens assembly 11 comprising one or more lenses (herein also referred to as lens elements) arranged to focus an image on the image sensor 3. The one or more lenses may have a diameter of at most 20 mm, preferably at most 15 mm, preferably at most 10 mm.

The actuator assembly 1 comprises a first bearing arrangement 20 (shown schematically in FIG. 1) that supports the first movable part 10 on the support structure 2. The first bearing arrangement 20 is a helical bearing arrangement arranged to guide helical movement of the first movable part 10 with respect to the support structure 2 around the helical axis H. The helical axis H is coincident with the primary axis O of the actuator assembly 1, the optical axis of one or more lenses of the lens assembly 11, and the longitudinal axis of the actuator assembly 1. The helical movement is shown in FIG. 1 by the arrow M. The helical motion may be along a circular helix, i.e. a helix with constant radius, but in general any helix is possible. The pitch of the helix may be constant or vary along the helical motion. The helical movement may be only a portion (e.g. equal to or less than one quarter, half, or three quarters) of a full turn of the helix.

The helical motion of the first movable part 10 guided by the first bearing arrangement 20 includes a component of translational movement along the helical axis H and a component of rotational movement around the helical axis H. The translational movement along the helical axis H is the desired movement of the first movable part 10, for example to change the focus of the image on the image sensor 3, and/or to change the magnification (zoom) of the image on the image sensor 3. The translational movement of the first movable part 10 along the helical axis H may also be desirable in pop-out cameras (also known as retractable lens cameras or telescoping cameras), for example to drive the camera to move between a retracted/collapsed state (e.g. in which the one or more lenses are configured such that they are not capable of focusing an image on the image sensor 3) and an extended/popped-out state (e.g. in which the one or more lenses are configured such that they are capable of focusing an image on the image sensor 3; in other words, in which the pop-out camera is in an operative state).

Figure 2:
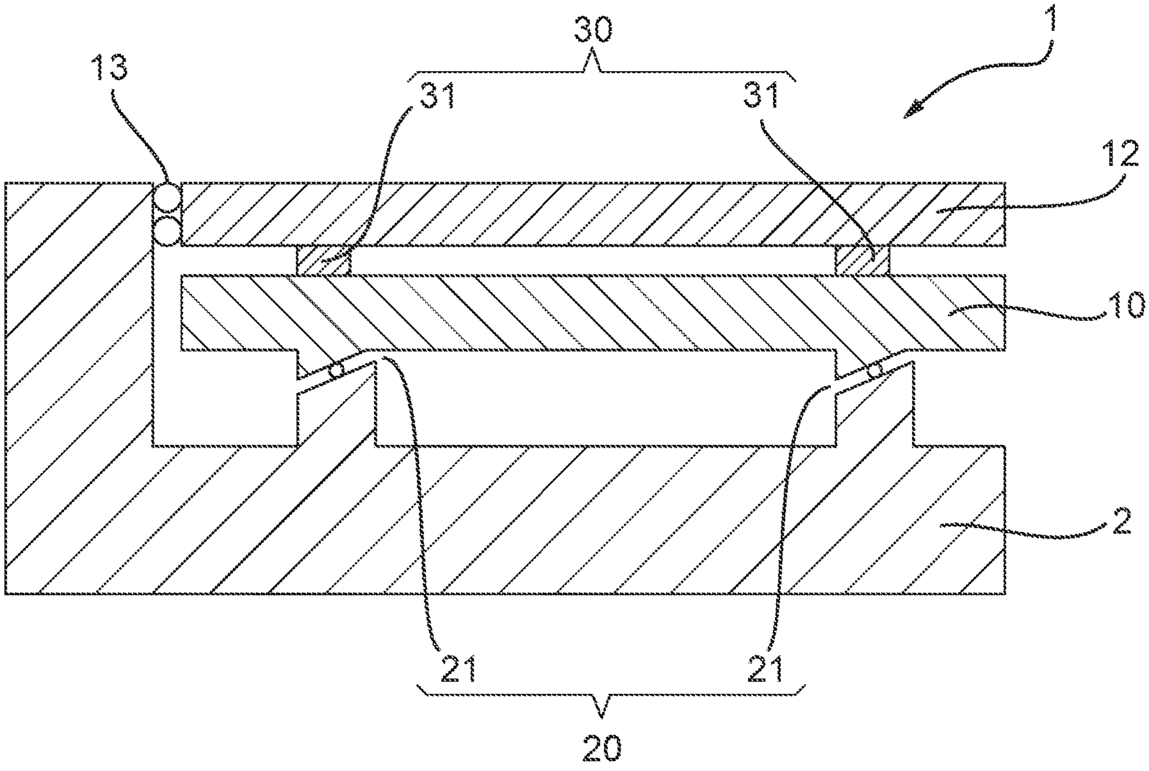
FIG. 2 is a schematic view of an actuator assembly with a helical bearing arrangement.

Actuator Assembly of FIG. 2

FIG. 2 is a schematic view of an actuator assembly 1 comprising all the features of the actuator assembly 1 of FIG. 1, and additionally comprising a second movable part 12, a second bearing arrangement 30 supporting the second movable part 12 on the first movable part 10, and a rotation control arrangement provided between the second movable part 12 and the support structure 2.

In FIG. 2, the first bearing arrangement 20 and the second bearing arrangement 30 are each illustrated as comprising a plurality of bearings 21, 31, however any number of bearings could be provided. For example, each of the first and second bearing arrangements 20, 30 may be provided with only one bearing instead of two.

The second movable part 12 may comprise a lens assembly comprising one or more lenses arranged to focus an image on the image sensor 3. Where this is the case, the first movable part 10 may not comprise the lens assembly 11. The one or more lenses of the second movable part 12 may have a diameter of at most 20 mm, preferably at most 15 mm, preferably at most 10 mm.

The second bearing arrangement 30 is provided between the first movable part 10 and the second movable part 12. The bearings 31 may, for example, be plain bearings and/or ball bearings. As opposed to the first bearing arrangement 20, the bearings 31 of the second bearing arrangement 30 are not helical bearings. In other words, the bearings 31 are non-helical bearings, and the second bearing arrangement 30 is a non-helical bearing arrangement.

The rotation control arrangement is capable of limiting rotation of the second movable part 12 around the axis O (i.e. the primary axis) relative to the support structure 2. The rotation control arrangement of FIG. 2 comprises an anti-rotation arrangement 13 (i.e. a third bearing arrangement) configured to prevent rotation of the second movable part 12 around the axis O relative to the support structure 2. In other words, the anti-rotation arrangement 13 is configured to restrict movement of the second movable part 12 to be in a linear direction along the axis O. The anti-rotation arrangement 13 is a linear bearing arrangement comprising, for example, plain bearings and/or ball bearings. The anti-rotation arrangement 13 is configured to guide the second movable part 12 to move relative to the support structure 2 only along the direction of the axis O.

The actuator assembly 1 further comprises an actuator arrangement (not shown in FIG. 2) configured to drive rotation of the first movable part 10 around the primary axis O relative to the support structure 2. When the actuator arrangement drives such rotation, the first bearing arrangement 20 converts the rotation of the first movable part 10 into helical movement of the first movable part 10 around the primary axis O relative to the support structure 2.

The second bearing arrangement 30 of FIG. 2 is configured such that, when the first movable part 10 undergoes helical movement and the second movable part 12 undergoes rotation limitation, the second movable part 12 undergoes non-rotational translational movement along the primary axis O relative to the support structure 2, but not relative to the first movable part 10. As such, when the actuator arrangement drives rotation of the first movable part 10 around the primary axis O relative to the support structure 2, the bearings 31 cause the second movable part 12 to undergo pure non-rotational translational movement along the primary axis O relative to the support structure (but not relative to the first movable part 10).

The translational movement of the first movable part 10 and the second movable part 12 may be used to, for example, change the focus of the image on the image sensor 3, and/or to change the magnification (zoom) of the image on the image sensor 3. It may also be used in pop-out cameras to drive the camera to move between the retracted/collapsed state and the extended/popped-out state. Prevention of rotation of the second movable part 12 around the axis O may, for example, be beneficial where parts of the second movable part 12 are not rotationally symmetric, or where the second movable part 12 is connected to a component that is not designed to rotate or is ideally not rotated around the axis O.

Figure 3:
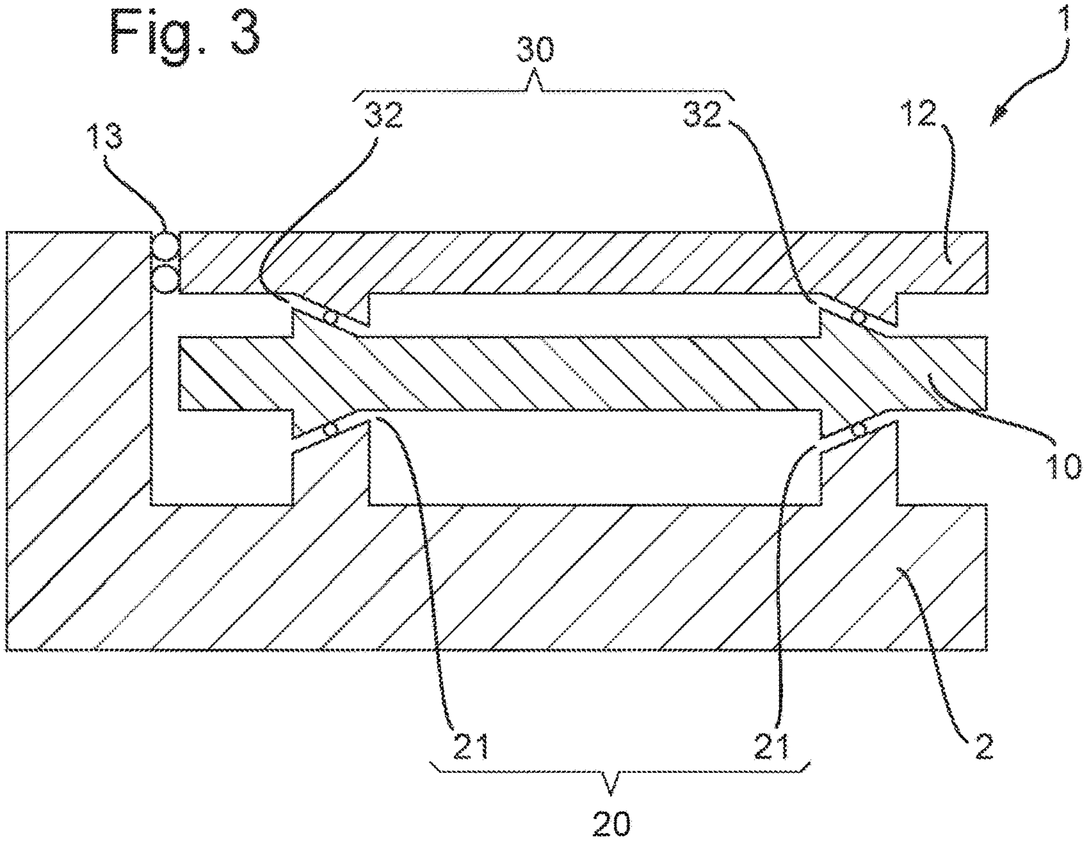
FIG. 3 is a schematic view of an actuator assembly with two helical bearing arrangements.

Actuator Assembly of FIG. 3

FIG. 3 is a schematic view of an actuator assembly 1 comprising all the features of the actuator assembly 1 of FIG. 2, but wherein the second bearing arrangement 30 comprises helical bearings 32 instead of non-helical bearings 31.

In FIG. 3, the second bearing arrangement 30 comprising the helical bearings 32 (hereinafter referred to as the second helical bearing arrangement 30) is illustrated as comprising two helical bearings 32, however any number of bearings could be provided. For example, the second bearing arrangement 30, may be provided with only one helical bearing.

The second helical bearing arrangement 30 is arranged to guide helical movement of the second movable part 12 with respect to the first movable part 10 around the axis O. The helical motion may be along a circular helix, i.e. a helix with constant radius, but in general any helix is possible. The pitch of the helix may be constant or vary along the helical motion. The helical movement may be only a portion (e.g. equal to or less than one quarter, half, or three quarters) of a full turn of the helix.

The helical bearings 32 are inclined at a sense opposite to the sense in which the helical bearings 21 are inclined. The helical bearings 21 are positively angled relative to a plane normal to the axis O, and the helical bearings 32 are negatively angled relative to a plane normal to the axis O. In other words, the helical bearings 21 has a positive slope/gradient relative to a plane normal to the axis O, and the helical bearings 32 have a negative slope/gradient relative to a plane normal to the axis O. The first bearing arrangement 20 and the second helical bearing arrangement 30 are both configured to guide helical movement around a common axis O.

Since the anti-rotation arrangement 13 is configured to prevent rotation of the second movable part 12 around the axis O relative to the support structure, when the actuator arrangement (also not shown in FIG. 3) drives rotation of the first movable part 10 around the axis O relative to the support structure 2, the second helical bearing arrangement 30 converts the rotation of the first movable part 10 into helical movement of the second movable part 12 around the axis O relative to the first movable part 10. The helical motion of the second movable part 12 includes a component of translational movement along the axis O and a component of rotational movement around the axis O.

Rotation of the first movable part 10 in a first direction around the axis O causes the first movable part to translationally move upwards along the axis O relative to the support structure 2, and simultaneously causes the second movable part 12 to translationally move upwards (with no rotation) along the axis O relative to the first movable part 10. Rotation of the first movable part 10 in a second opposite direction around the axis O causes the first movable part 10 to translationally move downwards along the axis O relative to the support structure 2, and simultaneously causes the second movable part 12 to translationally move downwards (with no rotation) along the axis O relative to the first movable part 10.

The distance moved by the second movable part 12 along the axis O is greater than the distance moved by the first movable part 10 in this direction. For example, when the helical bearings 30 of the first and second bearing arrangements are of the same design (except for being in opposite senses), the distance moved by the second movable part 12 along the axis O may be twice the distance moved by the first movable part 10 in the direction along the axis O.

The total linear movement of the second movable part 12 along the axis O with respect to the support structure 2 is equal to the sum of (i) the amount the first movable part 10 is moved along the axis O relative to the support structure 2 and (ii) the amount the second movable part 12 is moved along the axis O relative to the first movable part 10.

In comparison to the arrangement of FIG. 2, the arrangement of FIG. 3 provides a greater gain. In other words, the second movable part 12 moves a greater distance along the primary axis O for a given level of actuation of the actuator arrangement.

SMA Elements

Figure 4:
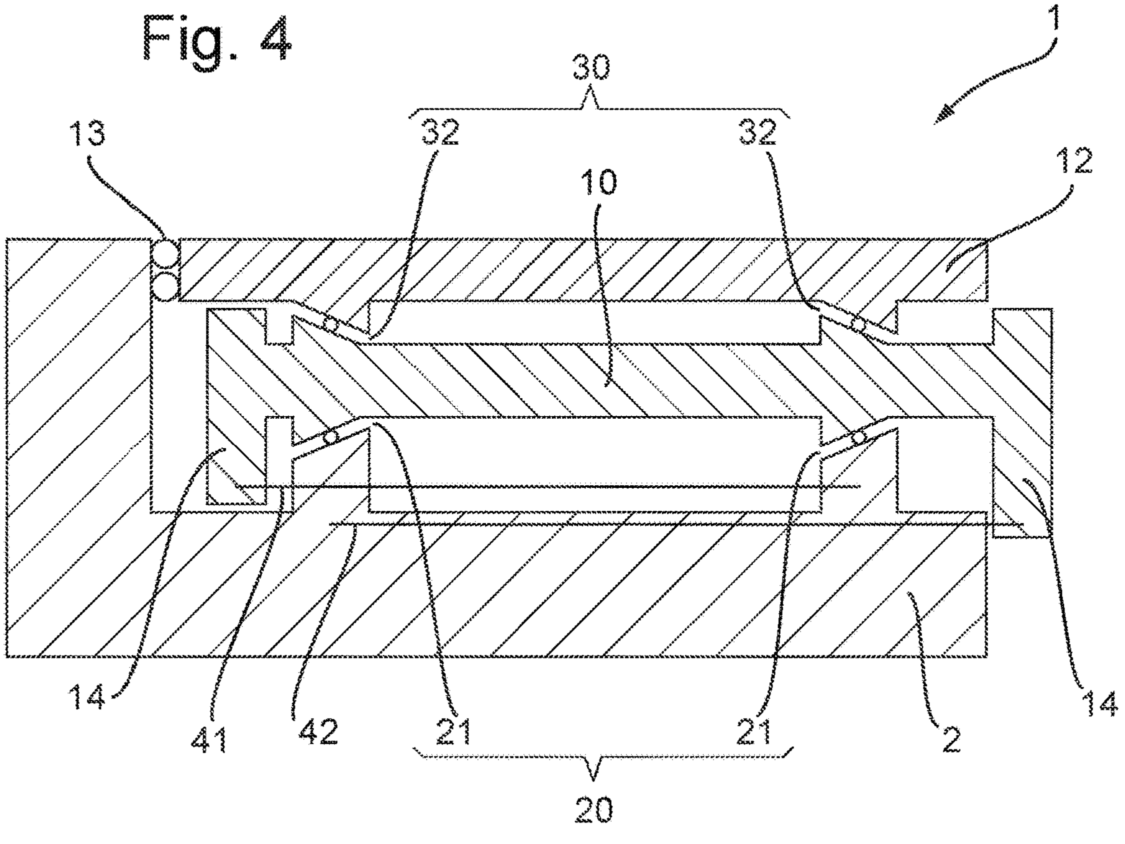
FIG. 4 is a schematic view of an actuator assembly with two helical bearing arrangements.

FIG. 4 is a schematic view of an actuator assembly 1 comprising all the features of the actuator assembly 1 of FIG. 3, and wherein the actuator arrangement comprises two SMA elements 41, 42 configured to drive rotation of the first movable part 10 around the axis O relative to the support structure 2. The SMA elements 41, 42 may be SMA wires, for example. The first bearing arrangement 20 is located between the SMA elements 41, 42 and the second bearing arrangement.

The first SMA element 41 is configured to, upon contraction, drive the rotation of the first movable part in a first sense around the axis O (e.g. drive rotation of the first movable part 10 in a clockwise direction when the actuator assembly 1 is viewed along the axis O). The first SMA element 41 is coupled to the support structure 2 and the first movable part 10.

The second SMA element 42 is configured to, upon contraction, drive the rotation of the first movable part 10 in a second opposite sense around the axis O (e.g. drive rotation of the first movable part 10 in an anti-clockwise direction when the actuator assembly 1 is viewed along the axis O). The second SMA element 42 is coupled to the support structure 2 and the first movable part 10.

In other words, the first and second SMA elements 41, 42 are configured to, upon contraction, drive relative rotation between the first movable part 10 and the support structure 2 around the axis O in opposite senses around the axis O.

The first movable part 10 comprises one or more protrusions 14 extending parallel to the primary axis O. The protrusions 14 are located radially outward of the first bearing arrangement 20 (e.g. the helical bearings 21 of the first bearing arrangement 20). The first SMA element 41 is coupled to a protrusion 14 of the first movable part 10. The second SMA element 42 is coupled to a protrusion 14 of the first movable part 10. The SMA elements 41, 42 extend in a plane normal to the primary axis O. The protrusions 14 are configured to provide locations at which the SMA elements 41, 42 are attached to the first movable part 10. The SMA elements 41, 42 may be coupled to the support structure 2 and/or the first movable part 10 by crimps.

Of course, during use of the actuator assembly 1, the position of the first movable part 10 relative to the support structure 2 along the primary axis O changes. This affects the angle of the SMA elements 41, 42 that are coupled between the support structure 2 and the first movable part 10. The SMA elements 41, 42 extend in a plane normal to the primary axis O when the first movable part 10 is in an intermediate/mid position between a retracted/collapsed position and an extended/popped-out position. When the first movable part is in a retracted/collapsed position and when the first movable part 10 is in an extended/popped-out position, the SMA elements 41, 42 may extend at an angle (e.g. an acute angle) to a plane normal to the primary axis O.

Figure 5:
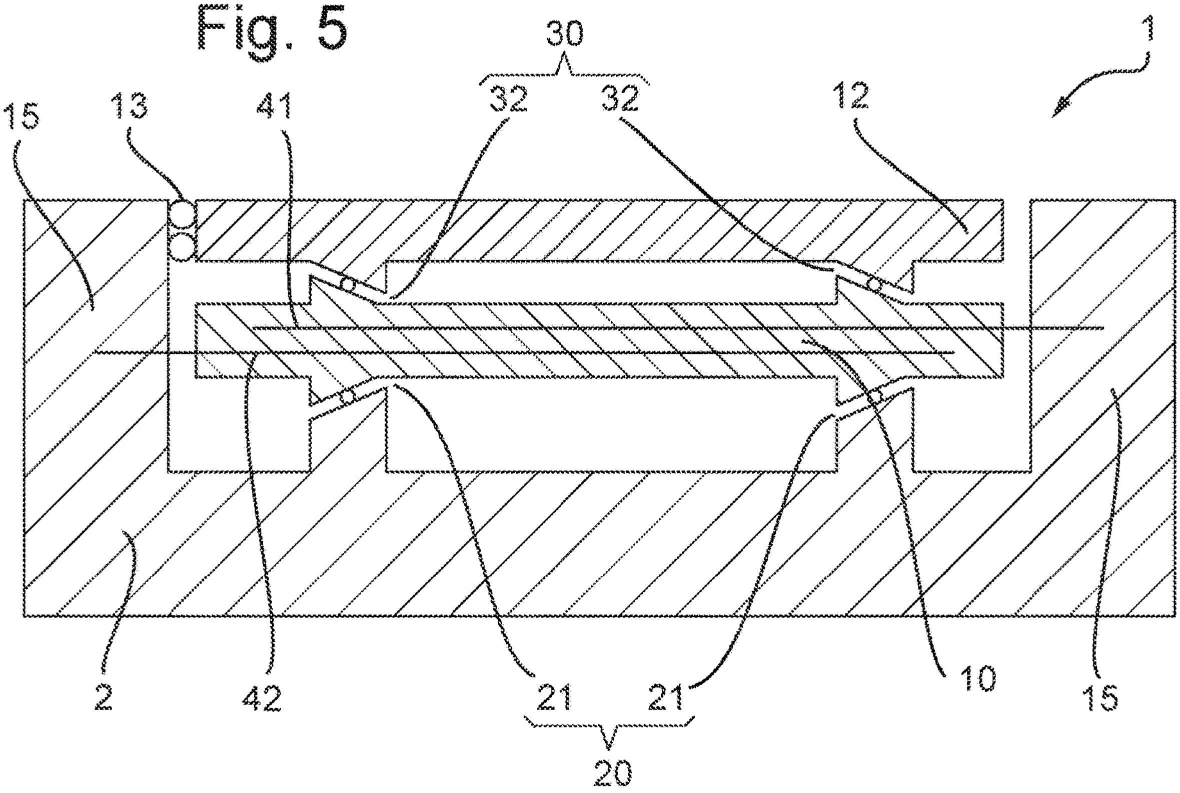
FIG. 5 is a schematic view of an actuator assembly with two helical bearing arrangements.

It is not essential for the first movable part 10 to comprise the protrusions 14 as shown in FIG. 5.

FIG. 5 is a schematic view of an actuator assembly 1 comprising all the features of the actuator assembly 1 of FIG. 4, but without the protrusions 14 and with the SMA elements 41, 42 located between the first and second bearing arrangements 20, 30. Instead of protrusions 14, the support structure 2 comprises protrusions 15 on opposite sides of the primary axis O. The protrusions 15 provide locations at which the SMA elements 41, 42 can be attached to the support structure 2.

Figure 6:
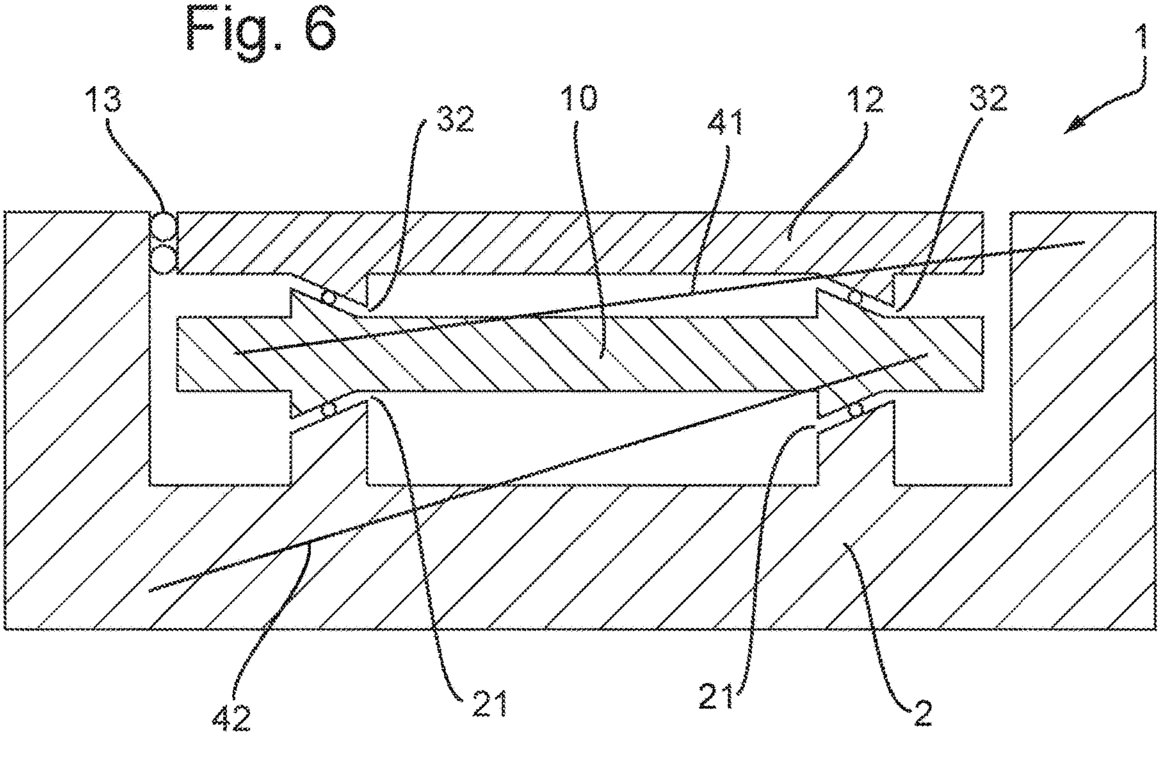
FIG. 6 is a schematic view of an actuator assembly with two helical bearing arrangements.

It is not essential for the SMA elements 40 to extend in a plane normal to the primary axis O as shown in FIG. 6.

FIG. 6 is a schematic view of an actuator assembly 1 comprising all the features of the actuator assembly 1 of FIG. 5, but with the SMA elements 41, 42 extending at an acute angle to a plane normal to the primary axis O (when the first movable part 1 is in the intermediate/mid position). In FIG. 6, the first and second SMA elements 41, 42 are both positively angled relative to a plane normal to the axis O, however one or both of the SMA elements 41, 42 may instead be negatively angled relative to a plane normal to the axis O.

Figure 7:
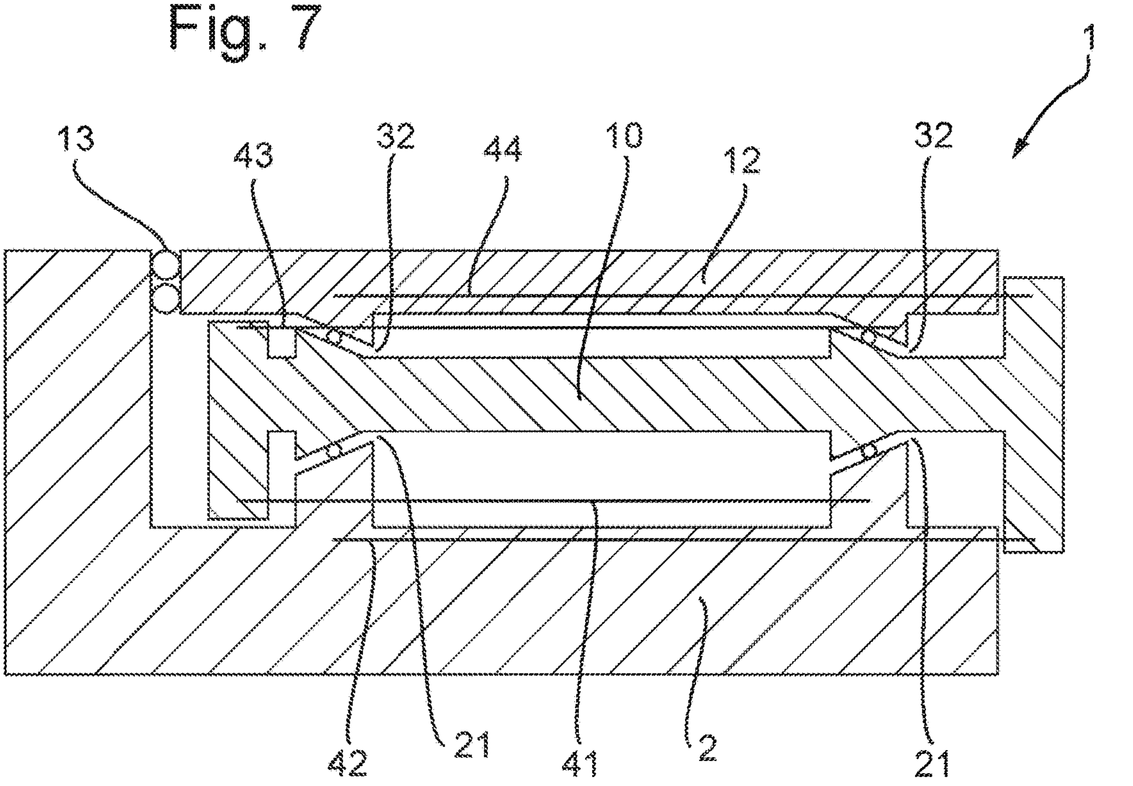
FIG. 7 is a schematic view of an actuator assembly with two helical bearing arrangements.

FIG. 7 is a schematic view of an actuator assembly 1 comprising all the features of the actuator assembly 1 of FIG. 4, but with a further actuator arrangement comprising two SMA elements 43, 44 (herein also referred to as the third SMA element 43 and the fourth SMA element 44). The second helical bearing arrangement 30 is located between the first movable part 10 and the third and fourth SMA elements 43, 44.

The further actuator arrangement is configured to drive relative rotation between the second movable part 12 and the first movable part 10 around the primary axis O.

The third and fourth SMA elements 43, 44 are configured to, upon contraction, drive relative rotation between the second movable part 12 and the first movable part 10 around the primary axis O in opposite senses around the axis O. The third and fourth SMA elements 43, 44 are coupled to the support structure 2 and the first movable part 10.

The provision of the further actuator arrangement makes it possible to reduce the forces transmitted through the third bearing arrangement 13 or even entirely remove the need to provide the third bearing arrangement 13 as it can act as the rotation control arrangement. In other words, the further actuator arrangement may be consider to be part of the rotation control arrangement as it is capable of limiting (and even fully preventing) rotation of the second movable part 12 around the axis O relative to the support structure 2.

The third SMA element 43 is coupled to a protrusion 14 of the first movable part 10. The fourth SMA element 44 is coupled to a protrusion 14 of the first movable part 10. The third and fourth SMA elements 43, 44 extend in a plane normal to the primary axis O. The protrusions 14 are configured to provide locations at which the third and fourth SMA elements 43, 44 are attached to the first movable part 10. The SMA elements 41, 42 may be coupled to the support structure 2 and/or the first movable part 10 by crimps.

Of course, during use of the actuator assembly 1, the position of the first movable part 10 relative to the support structure 2 along the primary axis O changes. This affects the angle of the third and fourth SMA elements 43, 44 that are coupled between the support structure 2 and the first movable part 10. The SMA elements 43, 44 extend in a plane normal to the primary axis O when the first movable part 10 is in an intermediate/mid position between a retracted/collapsed position and an extended/popped-out position. When the first movable part is in a retracted/collapsed position and when the first movable part 10 is in an extended/popped-out position, the SMA elements 43, 44 may extend at an angle (e.g. an acute angle) to a plane normal to the primary axis O.

Figure 8:
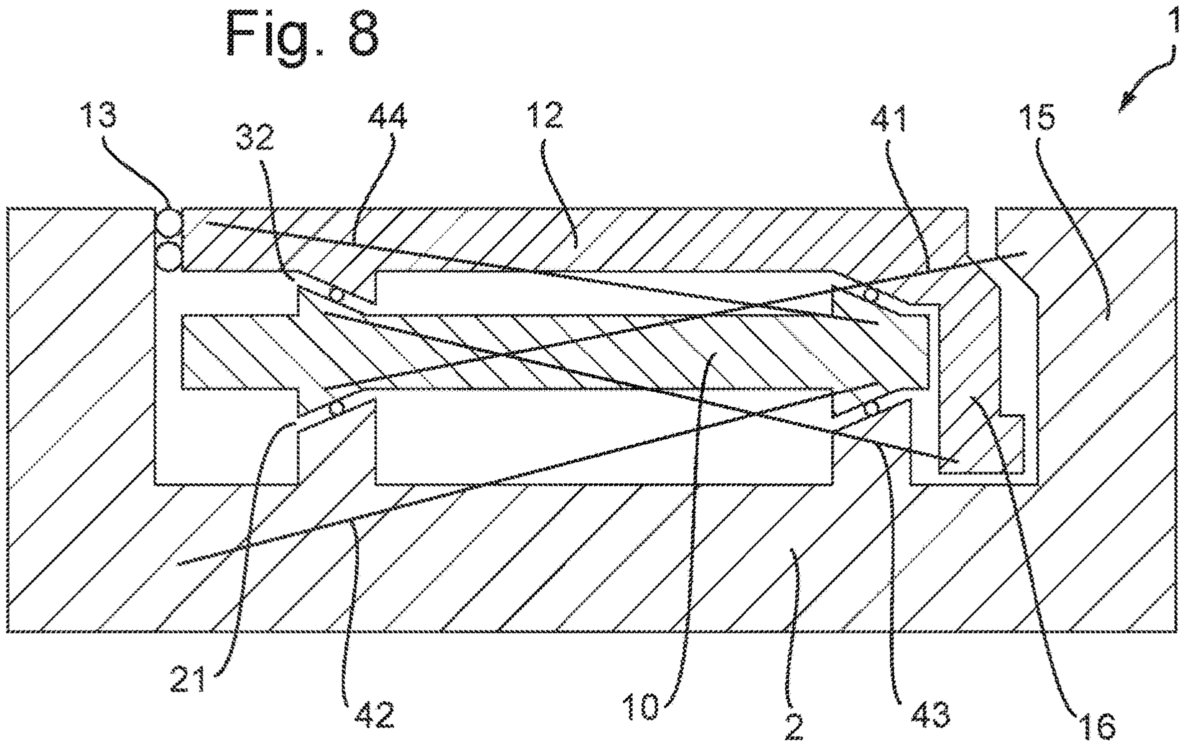
FIG. 8 is a schematic view of an actuator assembly with two helical bearing arrangements.

It is not essential for the SMA elements 43, 44 to extend in a plane normal to the primary axis O as shown in FIG. 8.

FIG. 8 is a schematic view of an actuator assembly 1 comprising all the features of the actuator assembly 1 of FIG. 7, but with the SMA elements 41, 42, 43, 44 extending at an acute angle to a plane normal to the primary axis O (when the first movable part 1 is in the intermediate/mid position) and without the protrusions 14.

Instead of protrusions 14, the support structure 2 comprises a protrusion 15 extending upward parallel to the primary axis O, and the second movable part 12 comprises a protrusion 16 extending downward parallel to the primary axis O. The protrusion 15 of the support structure 2 provides a location at which the first SMA element 41 can be attached to the support structure 2. The protrusion 16 of the second movable part 12 provides a location at which the third SMA element 43 can be attached to the support structure 2.

The first and second SMA elements 41, 42 are both positively angled relative to a plane normal to the axis O, however one or both of these SMA elements 41, 42 may instead be negatively angled relative to a plane normal to the axis O. The third and fourth SMA elements 43, 44 are both negatively angled relative to a plane normal to the axis O, however one or both of these SMA elements 43, 44 may instead be positively angled relative to a plane normal to the axis O.

Figure 9:
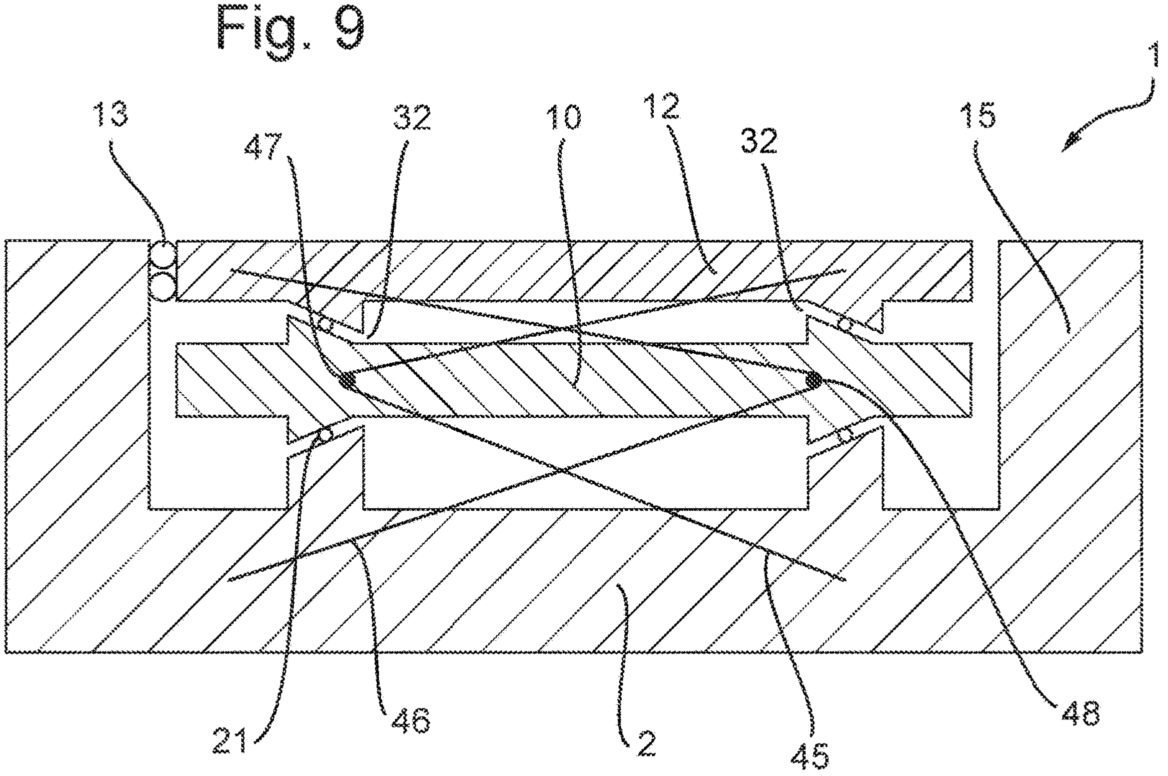
FIG. 9 is a schematic view of an actuator assembly with two helical bearing arrangements.

FIG. 9 is a schematic view of an actuator assembly 1 comprising all the features of the actuator assembly 1 of FIG. 5, but with two hooked SMA elements 45, 46 instead of the SMA elements 41 and 42 of FIG. 5.

The first hooked SMA element 45 is hooked around a first feature 47 of the first movable part 10. For example, the feature 47 of the first movable part 10 may be a pulley or a post. The feature 47 may be an integral part of the first movable part 10. Alternatively, the feature 47 may be fixedly connected to the main body of the first movable part 10.

The second hooked SMA element 46 is hooked around a second feature 48 of the first movable part 10. For example, the feature 48 of the first movable part 10 may be a pulley or a post. The feature 48 may be an integral part of the first movable part 10. Alternatively, the feature 48 may be fixedly connected to the main body of the first movable part 10.

The first and second hooked SMA elements 45, 46 are configured to, upon contraction, drive relative rotation between the first movable part 10 and the support structure 2 around the primary axis O, and drive relative rotation between the second movable part 12 and the first movable part 10 around the primary axis O. The first and second hooked SMA elements 45, 46 are both coupled to the support structure 2 and the second movable part 12 at its ends. The first and second hooked SMA elements 45, 46 are configured to, upon contraction, drive rotation of the first movable part 10 in opposite senses around the axis O.

Figure 10:
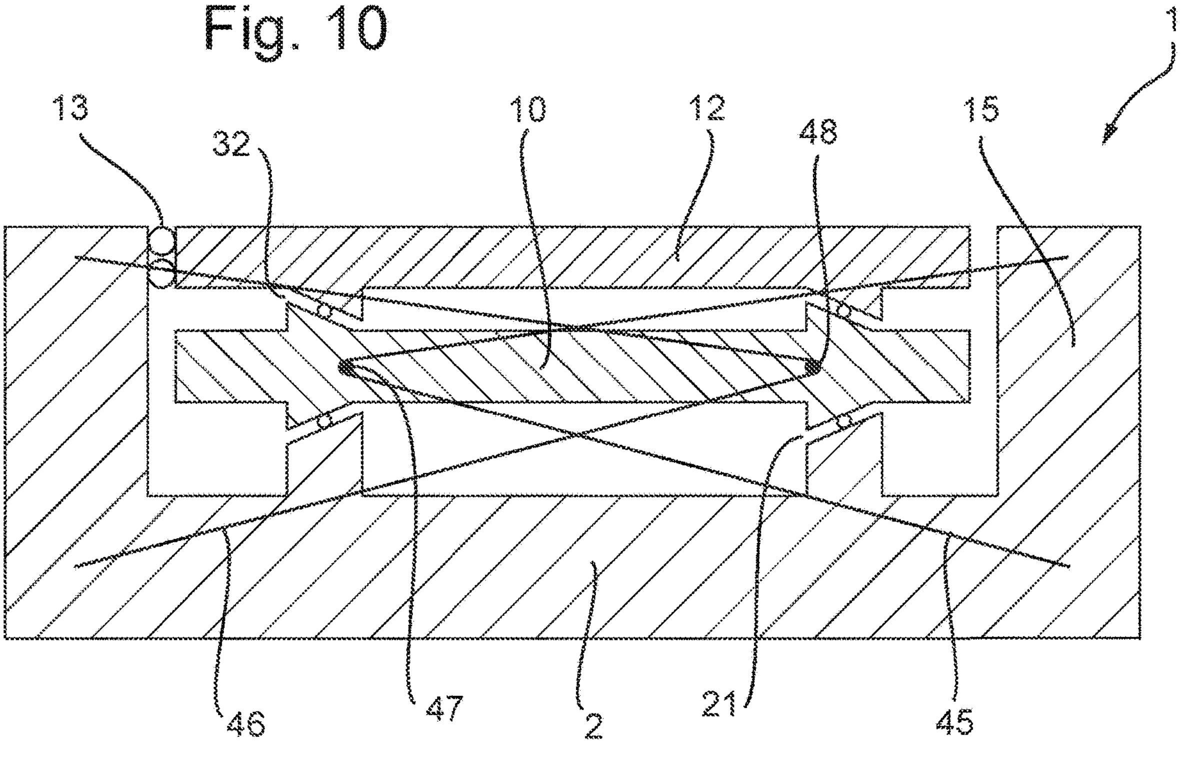
FIG. 10 is a schematic view of an actuator assembly with two helical bearing arrangements.

FIG. 10 is a schematic view of an actuator assembly 1 comprising all the features of the actuator assembly 1 of FIG. 9, but with the two hooked SMA elements 45, 46 both coupled to the support structure 2 at its ends, instead of coupled to the support structure 2 and the second movable part 12 at its ends.

Figure 11:
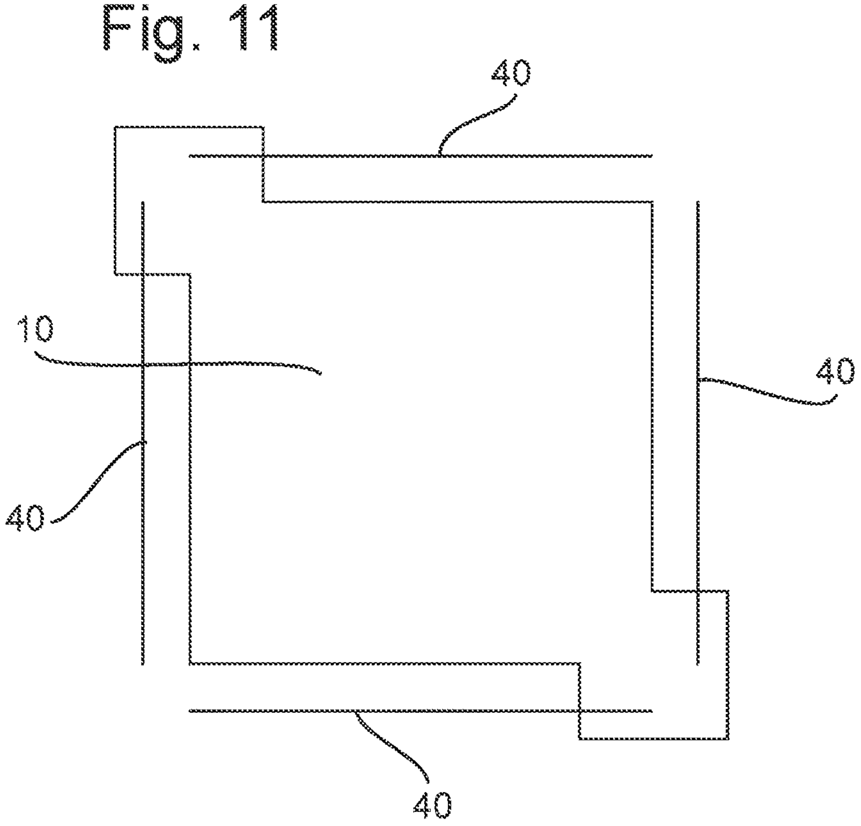
FIG. 11 is a schematic view of an actuator arrangement comprising SMA elements.

FIG. 11 is a plan view of a first movable part 10 of an actuator assembly 1. The first movable part 10 of FIG. 11 may be the first movable part 10 of the actuator assembly 1 of FIG. 1, 2 or 3.

The actuator arrangement of FIG. 11 comprises four SMA elements 40. The SMA elements 40 are configured to drive the rotation of the first movable part 10. The actuator arrangement comprises a total of (i.e. only) four SMA elements 40. Alternatively, additional SMA elements may be provided.

The four SMA elements 40 are arranged in a loop at different angular positions around the primary axis O. Successive SMA elements 40 around the primary axis O are configured to apply a force to the first movable part 10 in alternate senses around the primary axis O. The first SMA element 40 shown horizontally at the top of the drawing is configured to apply a force to rotate the first movable part 10 clockwise. The next SMA element 40 shown on the right-hand side of FIG. 11 is configured to apply a force to the first movable part 10 in the opposite sense, i.e. to rotate the movable part 10 anti-clockwise relative to the support structure 2. The next SMA element 40 shown at the bottom of FIG. 18 is configured to apply force to rotate the first movable part 10 clockwise relative to the support structure 2 (i.e. in the same sense as the SMA element 40 shown at the top of FIG. 11). The last SMA element 40 (going around the primary axis O) shown on the left-hand side of FIG. 11 is arranged to rotate the first movable part 10 anti-clockwise (i.e. in the same sense as the SMA element 40 shown on the right-hand side of FIG. 11). The SMA elements 40 may be configured to apply a force to the first movable part 10 on contraction of the SMA elements 40.

In FIG. 11, the support structure 2 and the second movable part 12 are not shown. It is to be understood that the SMA elements 40 may be coupled between the first movable part 10 and the support structure 2. Alternatively, the SMA elements 40 shown in FIG. 18 may be coupled between the first movable part and the second movable part 12. As a further alternative, at least one of the SMA elements 40 may be coupled between the first movable part and the support structure 2 while at least one other of the SMA elements 40 is coupled between the first movable part and the second movable part 12.

Figure 12:
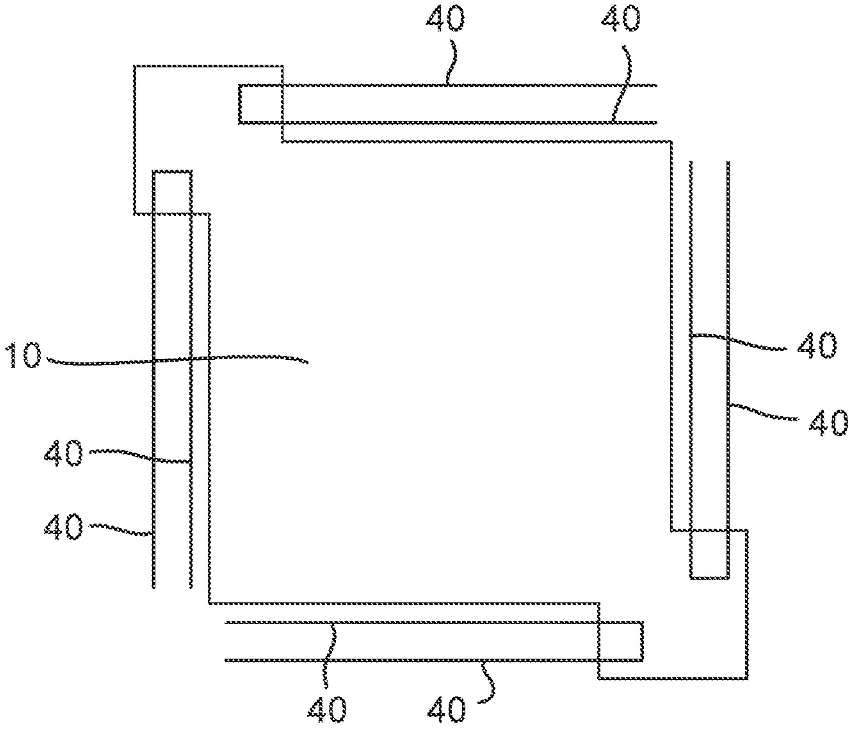
FIG. 12 is a schematic view of an actuator arrangement comprising SMA elements.

FIG. 12 is a schematic view of a modified version of the arrangement shown in FIG. 11. As shown in FIG. 12, the SMA elements 40 on each side of the first movable part 10 are hooked onto the first movable part 10, for example similar to the hooked SMA elements shown in FIGS. 9 and 10. As a further alternative, instead of providing hooked SMA elements 40, a plurality (e.g. two) SMA elements 40 may be provided on each side of the first movable part 10.

As shown in FIG. 12, the SMA elements 40 are coupled to the first movable part 10. The ends of the SMA elements 40 are not shown in FIG. 12 as being attached to anything. However, in practice the ends of the SMA elements 40 are attached to the second movable part 12 and/or to the support structure 2.

Figure 13:
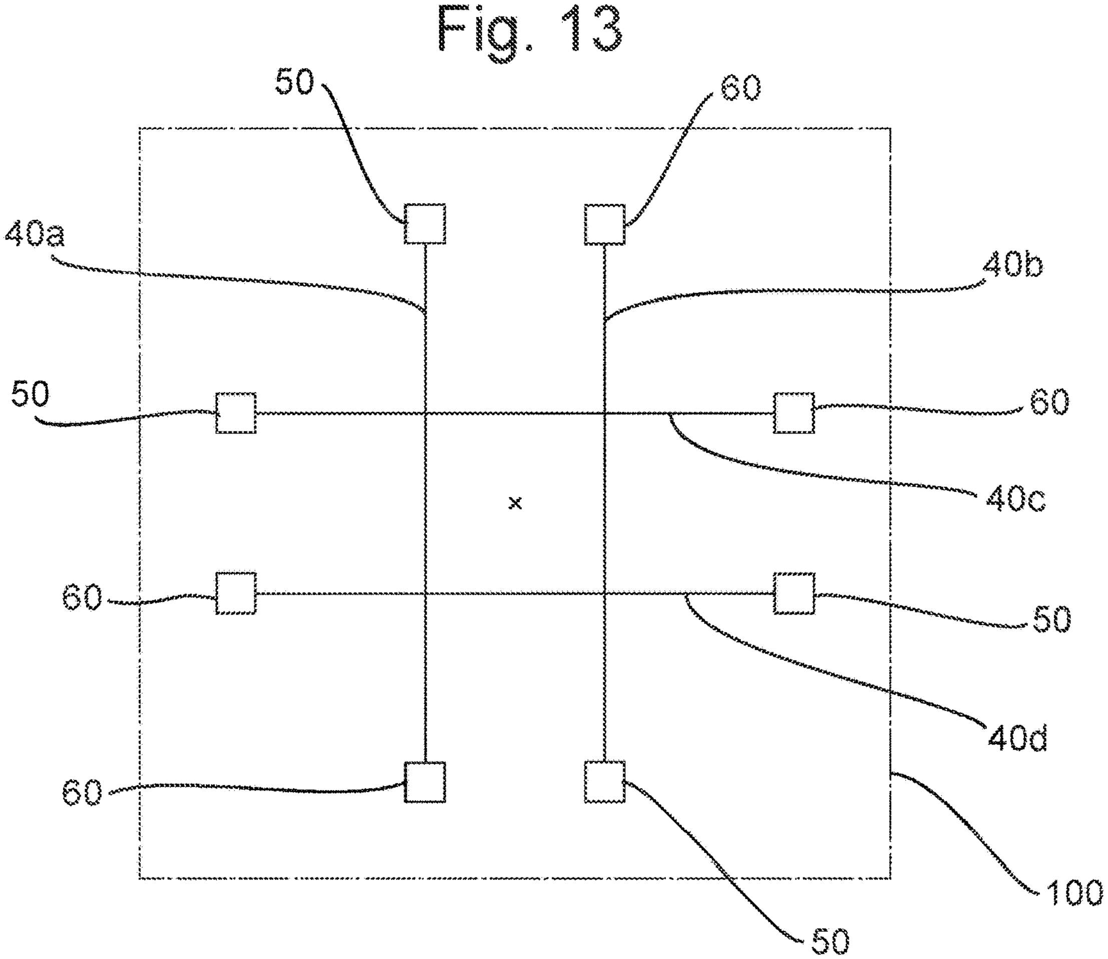
FIG. 13 is a schematic view of an actuator arrangement comprising SMA elements.

An alternative arrangement of SMA elements is shown in FIG. 13. As in the embodiments of FIGS. 11 and 12, the actuator arrangement comprises four SMA elements. The four SMA elements 40*a*, 40*b*, 40*c* and 40*d* are configured to drive rotation of the first movable part 10 (not shown). The SMA elements are connected at one end to the support structure by crimps (or some other connection element) 50 and at the other end to the first movable part by crimps (or some other connection element) 60. Alternatively, the SMA elements in this arrangement could be attached at both ends to one of the support structure or first movable part and hooked over the other of the support structure and first movable part. Alternatively, the SMA elements could be connect between the first movable part and the second movable part (rather than between the first movable part and the support structure).

Each of the SMA elements 40*a-d* crosses over an adjacent SMA element (moving around the primary axis) when viewed along the primary axis.

The SMA elements 40*a-d* comprises a first pair of SMA elements 40*a* and 40*b*, which both act to drive rotation of the first movable part in a first sense, and a second pair of SMA elements, which both act to drive rotation of the first movable part in a second sense, opposite to the first sense. Each of the first pair overlap each of the second pair when viewed along the primary axis (which is indicated by the cross in the centre of FIG. 13).

The actuator assembly may be arranged such that each of the four SMA elements 40*a-d* overlap the first movable part and/or the second movable part entirely when viewed along the primary axis. In other words, each of the four SMA elements 40*a-d* may sit within the footprint of the first movable part and/or the second movable part when viewed along the primary axis. The footprint of the first and/or second movable parts is indicated by the dashed line 100 in FIG. 13. In some embodiments the SMA elements may only partially overlap with the footprint of the first and/or second movable parts when viewed along the primary axis.

The arrangement of SMA elements shown in FIG. 13 has a number of advantages. Firstly, it may save space (in a plane perpendicular to the primary axis) as compared to a situation in which the SMA elements sit outside of the footprint of other components of the assembly. Secondly, the position of the points at which the SMA elements are coupled to (e.g. crimped to or hooked onto) the first movable part, closer in to the primary axis than the arrangements shown in FIGS. 11 and 12, means that a greater amount of rotation of the first movable part may be achieved. Since the coupling points are closer to the axis of rotation, the first movable part will be driven to rotate by a greater amount per unit contraction of the SMA elements (as compared to a situation in which the coupling points are further from the axis of rotation).

The term 'shape memory alloy (SMA) element' may refer to any element comprising SMA. The SMA element may be described as an SMA wire. The SMA element may have any shape that is suitable for the purposes described herein. The SMA element may be elongate and may have a round cross section or any other shape cross section. The cross section may vary along the length of the SMA element. The SMA element might have a relatively complex shape such as a helical spring. It is also possible that the length of the SMA element (however defined) may be similar to one or more of its other dimensions. The SMA element may be sheet-like, and such a sheet may be planar or non-planar. The SMA element may be pliant or, in other words, flexible. In some examples, when connected in a straight line between two components, the SMA element can apply only a tensile force which urges the two components together. In other examples, the SMA element may be bent around a component and can apply a force to the component as the SMA element tends to straighten under tension. The SMA element may be beam-like or rigid and may be able to apply different (e.g. non-tensile) forces to elements. The SMA element may or may not include material(s) and/or component(s) that are not SMA. For example, the SMA element may comprise a core of SMA and a coating of non-SMA material. Unless the context requires otherwise, the term 'SMA element' may refer to any configuration of SMA material acting as a single actuating element which, for example, can be individually controlled to produce a force on an element. For example, the SMA element may comprise two or more portions of SMA material that are arranged mechanically in parallel and/or in series. In some arrangements, the SMA element may be part of a larger SMA element. Such a larger SMA element might comprise two or more parts that are individually controllable, thereby forming two or more SMA elements. The SMA element may comprise an SMA wire, SMA foil, SMA film or any other configuration of SMA material. The SMA element may be manufactured using any suitable method, for example by a method involving drawing, rolling or deposition and/or other forming process(es). The SMA element may exhibit any shape memory effect, e.g. a thermal shape memory effect or a magnetic shape memory effect, and may be controlled in any suitable way, e.g. by Joule heating, another heating technique or by applying a magnetic field.

Stacked and/or Nested

FIGS. 2 to 10 show the first movable part 10 and the second movable part 12 stacked along the direction of the helical axis H. The main body of the first movable part 10 is configured to be positioned between the support structure 2 and the second movable part 12 along the primary axis O at any position within the range of possible movement of the first movable part 10. The main body of the first movable part 10 comprises the centre of the first movable part 10. The main body of the first movable part 10 comprises the central portion of the first movable part 10. The support structure 2, the first movable part 10 and the second movable part 12 are stacked along the primary axis O.

Alternatively, the actuator assembly 1 may be configured such that when the actuator assembly 1 is in a retracted/collapsed state, the first movable part 10 (e.g. the main body or centre or central portion of the first movable part 10) is nested with a space (e.g. an opening, aperture, or pocket) defined (or enclosed) by the support structure 2. And when the actuator assembly 1 is in an extended/popped-out state, the first movable part 10 is positioned outside said space defined by the support structure 2.

The actuator assembly 1 may also be configured such that when the actuator assembly 1 is in a retracted/collapsed state, the second movable part 12 (e.g. the main body of the second movable part 12) is nested within a space defined by the first movable part 10. Optionally, when the actuator assembly 1 is in an extended state, the second movable part 12 is positioned outside said space defined by the first movable part 10. The above-mentioned space defined by the first movable part 10 may overlap said space defined by the support structure 2.

Zero Hold Power

Optionally, the first bearing arrangement 20 and/or the second bearing arrangement 30 (or some other part of the assembly 1, as described below) is arranged to have sufficient friction when loaded that the first movable part 10 and/or the second movable part 12, over a continuum of positions, remains in position when the actuator components are not driving rotation of the first movable part 10. This may allow the first movable part 10 to be controlled to maintain any arbitrary helical position relative to the support structure 2. The friction within the bearing arrangements may allow the first movable part 10 to be kept at any of a continuum of positions.

Optionally, a biasing arrangement is arranged to load the first bearing arrangement 20 and/or the second bearing arrangement 30 so as to generate frictional forces therein that constrain the movement of the first movable part 10 relative to the support structure 2 at any position within a range of movement when the actuator components are not actuated. The constraining of the first movable part may be such that the helical position of the first movable part 10 is maintained relative to the support structure 2.

Optionally, the first bearing arrangement 20 comprises a friction surface of the support structure 2 configured to engage a friction surface of the first movable part 10. Additionally or alternatively, the second bearing arrangement comprises a friction surface of the first movable part 10 configured to engage a friction surface of the second movable part 12.

Optionally, the friction may be provided (additionally or alternatively) elsewhere in the actuator assembly 1. Optionally, there may be sufficient friction in a bearing between the second movable part 12 and the support structure 2. For example, the third bearing arrangement 13 in any of FIGS. 2-10 may be a planar bearing which has sufficient friction when loaded that the first movable part 10 and/or the second movable part 12, over a continuum of positions, remains in position when the actuator components are not driving rotation of the first movable part 10. Such a third bearing arrangement 13 may or may not form part of a rotation control arrangement. For example, the rotation control may instead be provided by a further actuator arrangement (e.g. one or more SMA elements), for example as described with reference to FIG. 7.

Figure 14:
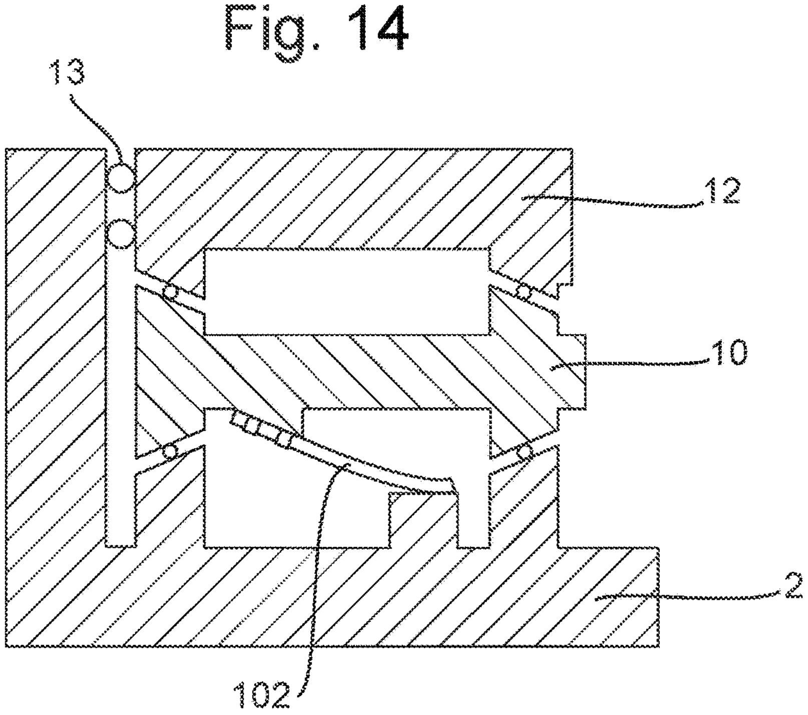
FIG. 14 is a schematic view of an actuator assembly.

Optionally, the friction may (alternatively or additionally) be provided at locations other than bearings. For example, the actuator assembly may comprise a friction component such as a spring arm. With reference to FIG. 14, the actuator assembly 1 comprises a spring arm 102 which is connected to the first movable part 10 at a first end and in contact with the support structure 2 at a second end. The spring arm 102 is resilient and exerts a normal force on the support structure 2 which results in frictional forces between the spring arm 102 and the support structure 2. As shown in FIG. 14, the support structure 2 may be shaped so as to provide a surface for engagement with the spring arm 102. The spring arm 102 may alternatively be connected to the support structure and in contact with the first movable part. The spring may alternatively be arranged between the second movable part and the support structure (e.g. connected to one of the support structure and the second movable part and in contact with the other).

Optionally, the actuator assembly 1 comprises a biasing arrangement configured to bias the friction surfaces of the first bearing arrangement 20 and/or bias the friction surfaces of the second bearing arrangement against each other. The biasing arrangement may alternatively be known as a loading arrangement. The biasing arrangement is configured to generate static frictional forces that constrain the movement of the first movable part 10 relative to the support structure 2 (and relative to the second movable part 12) at any position within the range of possible movement of the first movable part 10 when the actuator arrangement is not driving the rotation of the first movable part 10.

Optionally, the actuator assembly 1 comprises a holding arrangement configured to releasably (e.g. temporarily) hold the first movable part 10 at one or more positions within the range of possible positions that the first movable part 10 is capable of being driven to (e.g. by the actuator arrangement). The holding arrangement may comprise a mechanism comprising a protrusion configured to engage a notch. For example, the protrusion may be a spring-loaded protrusion. This may help to lock the position of the second movable part 12 along the primary axis O. This may be desirable when it is desired to retain the position of the second movable part 12. Additionally or alternatively, the holding arrangement may comprise a magnetic arrangement.

Bistable Arrangement

Optionally, the actuator assembly 1 comprises a bistable arrangement (not shown) configured to cause the first movable part 10 to have a first stable equilibrium position (at a first position around the primary axis), a second stable equilibrium position (at a second position around the primary axis), and an unstable equilibrium position between the first and second stable equilibrium positions (at a third intermediate position around the primary axis). The first and second stable equilibrium positions may correspond to ends of the range of possible movement of the first movable part 10 relative to the support structure 2. The bistable arrangement may comprise e.g. a spring, a flexure, or one or more magnets configured to exert a force on the first movable part 10 so as to provide such bi-stableness.

Other Variations

It will be appreciated that there may be many other variations of the above-described examples.

The actuator arrangements of FIGS. 4 to 10 comprise SMA elements configured to drive the rotation of the first movable part 10 in opposite senses. However, it is not essential for the actuator arrangement to comprise SMA elements configured to drive the rotation of the first movable part 10 in opposite senses. For example, the actuator arrangements may only comprise one or more SMA elements configured to drive the rotation of the first movable part 10 in only one sense. The rotation of the first movable part in the opposite sense may be effected by a resilient element, for example. The resilient element may be arranged to provide a biasing force to bias the rotational position of the first movable part 10 relative to the support structure 2.

The actuator arrangement may, for example, be a voice coil motor (VCM) actuator arrangement or a piezoelectric actuator arrangement, instead of a SMA actuator arrangement.

For example, the actuator assembly 1 may comprise a mixture of sliding bearing and rolling bearings. As a further alternative, the bearing arrangements may comprise flexure arrangements.

The actuator assembly can be used for AF, zoom, haptics, OIS, valves, AR applications, etc.

The invention claimed is:

1. An actuator assembly comprising:

a support structure;

a first movable part;

a second movable part;

an actuator arrangement configured to drive rotation of the first movable part around a primary axis relative to the support structure;

a first bearing arrangement configured to convert said rotation of the first movable part into helical movement of the first movable part around the primary axis relative to the support structure;

a rotation control arrangement capable of limiting rotation of the second movable part around the primary axis relative to the support structure; and a second bearing arrangement configured such that, when the first movable part undergoes said helical movement and the second movable part undergoes said rotation limitation, the second movable part undergoes translational movement along the primary axis relative to the support structure and/or the first movable part.

2. An actuator assembly according to claim 1, wherein the rotation control arrangement is an anti-rotation arrangement configured to prevent rotation of the second movable part around the primary axis relative to the support structure.

3. An actuator assembly according to claim 2, wherein the anti-rotation arrangement comprises a third bearing arrangement configured to provide said rotation prevention.

4. An actuator assembly according to claim 1, wherein the rotation control arrangement comprises a further actuator arrangement configured to drive rotation of the second movable part around the primary axis relative to the first movable part and/or the support structure so as to provide said rotation limitation.

5. An actuator assembly according to claim 1, wherein the first bearing arrangement comprises a helical bearing configured to guide relative helical movement between the first movable part and the support structure around the primary axis.

6. An actuator assembly according to claim 1, wherein the second bearing arrangement comprises a helical bearing configured to guide relative helical movement between the first movable part and the second movable part around the primary axis.

7. An actuator assembly according to claim 5, wherein the second bearing arrangement comprises a helical bearing configured to guide relative helical movement between the first movable part and the second movable part around the primary axis, and wherein the helical bearing of the first bearing arrangement is positively angled relative to a plane normal to the primary axis, and the helical bearing of the second bearing arrangement is negatively angled relative to a plane normal to the primary axis.

8. An actuator assembly according to claim 1, wherein the actuator arrangement comprises one or more shape memory alloy (SMA) elements configured to drive the rotation of the first movable part in a first sense.

9. An actuator assembly according to claim 8, wherein the actuator arrangement comprises one or more SMA elements configured to drive the rotation of the first movable part in a second sense, which is opposite to the first sense.

10. An actuator assembly according to claim 8, wherein the one or more SMA elements configured to drive the rotation of the first movable part in the first sense comprise:

an SMA element coupled to the support structure and the first movable part, and/or an SMA element coupled to the first movable part and the second movable part.

11. An actuator assembly according to claim 9, wherein the one or more SMA elements configured to drive the rotation of the first movable part in the second sense comprise:

an SMA element coupled to the support structure and the first movable part, and/or an SMA element coupled to the first movable part and the second movable part.

12. An actuator assembly according to claim 8, wherein the one or more SMA elements configured to drive the rotation of the first movable part in the first sense extend in, and/or extend at an acute angle to, a plane normal to the primary axis.

13. An actuator assembly according to claim 9, wherein the one or more SMA elements configured to drive the rotation of the first movable part in the second sense extend in, and/or extend at an acute angle to, a plane normal to the primary axis.

14. An actuator assembly according to claim 1, wherein the actuator arrangement comprises four SMA elements configured to drive the rotation of the first movable part; wherein the four SMA elements are arranged in a loop at different angular positions around the primary axis; and wherein successive SMA elements around the primary axis are configured to apply a force to the first movable part in alternate senses around the primary axis.

15. An actuator assembly according to claim 1, wherein the support structure, the first movable part and the second movable part are stacked along the primary axis.

16. An actuator assembly according to claim 1, wherein the main body of the first movable part is configured to be positioned between the support structure and the second movable part along the primary axis at any position within the range of possible movement of the first movable part.

17. An actuator assembly according to claim 1, wherein the actuator assembly is configured such that:

when the actuator assembly is in a retracted state, the first movable part is nested within a space defined by the support structure; and when the actuator assembly is in an extended state, the first movable part is positioned outside the space defined by the support structure.

18. An actuator assembly according to claim 1, wherein the actuator assembly is configured such that:

when the actuator assembly is in a retracted state, the second movable part is nested within a space defined by the first movable part; and when the actuator assembly is in an extended state, the second movable part is positioned outside the space defined by the first movable part.

19. An actuator assembly according to claim 1 configured to retain the second movable part in position with respect to the support structure when the actuator arrangement is unpowered.

20. An actuator assembly according to claim 19 comprising a first friction surface and a second friction surface, wherein the first friction surface is configured to engage the second friction surface; and wherein the actuator assembly comprises a biasing arrangement configured to bias the first and second friction surface against each other, so as to generate static frictional forces that constrain the movement of the second movable part relative to the support structure at any position within the range of possible movement of the second movable part when the actuator arrangement is not driving the rotation of the first movable part.

21. An actuator assembly according to claim 1, wherein the actuator assembly comprises a holding arrangement configured to releasably hold the first movable part at one or more positions within the range of possible positions that the first movable part is capable of being driven to.

22. An actuator assembly according to claim 1, comprising a bistable arrangement configured to cause the first movable part to have a first stable equilibrium position, a second stable equilibrium position, and an unstable equilibrium position between the first and second stable equilibrium positions.

23. An actuator assembly according to claim 1 wherein the actuator arrangement comprises two shape memory alloy (SMA) elements which cross over each other when viewed along the primary axis.

24. An actuator assembly according to claim 1, wherein the actuator arrangement comprises a first pair of SMA elements and a second pair of SMA elements, wherein each of the first pair of SMA elements cross over each of the second pair of SMA elements when viewed along the primary axis.

25. An actuator assembly according to claim 14, wherein each SMA element of the four SMA elements crosses over at least one of the other SMA elements when viewed along the primary axis.

26. An actuator assembly according to claim 23, wherein each of the SMA elements is disposed within a footprint of one or both of the first and second movable parts when viewed along the primary axis.

27. An actuator assembly according to claim 1, wherein the second movable part comprises a display.

28. An actuator assembly according to claim 1, wherein the second movable part comprises an optical component or a part thereof.

29. An actuator assembly according to claim 1, wherein the actuator arrangement is configured to apply a force to the first movable part at a first point to drive rotation of the first movable part around the primary axis relative to the support structure, wherein a distance between the primary axis and the first point is less than a distance between the primary axis and the first bearing arrangement.

* * * * *